(12) United States Patent
Yu

(10) Patent No.: US 7,775,095 B2
(45) Date of Patent: *Aug. 17, 2010

(54) VALVE STEM WITH A CONNECTING CAP FOR A TIRE PRESSURE DETECTOR

(75) Inventor: Hung-Chih Yu, Taichung (TW)

(73) Assignee: Orange Electronic Co., Ltd., Taichung Hsien (TW)

( * ) Notice: Subject to any disclaimer, the term of this patent is extended or adjusted under 35 U.S.C. 154(b) by 246 days.

This patent is subject to a terminal disclaimer.

(21) Appl. No.: 12/034,056

(22) Filed: Feb. 20, 2008

(65) Prior Publication Data

US 2009/0206294 A1  Aug. 20, 2009

(51) Int. Cl.
*G01M 17/02* (2006.01)
(52) U.S. Cl. .................................... 73/146; 73/146.8
(58) Field of Classification Search ........................ None
See application file for complete search history.

(56) References Cited

U.S. PATENT DOCUMENTS

| | | | | |
|---|---|---|---|---|
| 6,055,855 A * | 5/2000 | Straub | | 73/146.8 |
| 6,591,672 B2 * | 7/2003 | Chuang et al. | | 73/146.8 |
| 6,647,772 B2 * | 11/2003 | Ito et al. | | 73/146 |
| 6,912,897 B2 * | 7/2005 | Luce | | 73/146.8 |
| 6,945,104 B2 * | 9/2005 | Uleski | | 73/146.8 |
| 6,952,955 B1 * | 10/2005 | Uleski | | 73/146 |
| 6,952,957 B2 * | 10/2005 | Kayukawa | | 73/146.8 |
| 6,959,597 B2 * | 11/2005 | Ito et al. | | 73/146.8 |
| 7,021,133 B1 * | 4/2006 | Hsu | | 73/146.8 |
| 7,145,443 B2 * | 12/2006 | Ito et al. | | 340/442 |
| 7,284,418 B2 * | 10/2007 | Yin et al. | | 73/146.8 |
| 7,454,965 B2 * | 11/2008 | Blossfeld et al. | | 73/146 |
| 7,469,581 B2 * | 12/2008 | Katou et al. | | 73/146.8 |
| 7,516,653 B2 * | 4/2009 | Blossfeld | | 73/146.8 |
| 7,536,904 B1 * | 5/2009 | Yu | | 73/146.8 |

* cited by examiner

*Primary Examiner*—Lisa M Caputo
*Assistant Examiner*—Jermaine Jenkins
(74) *Attorney, Agent, or Firm*—Rahman LLC

(57) ABSTRACT

A valve stem with a connecting cap for a tire pressure detector has a body, a connecting cap and a fastener. The body is tubular, is a valve stem applied for truck and has an outer section, an inner section and a fixing nut. The inner section is integrally formed coaxially on the outer section and has an outlet hole being formed thereon. The fixing nut is movably mounted on the outer section. The connecting cap is cylinder, has an outer end and a hole and is detachably mounted on the inner section. The hole is coaxially and longitudinally formed on the connecting cap. The fastener corresponds to the hole and the outlet hole and holds a wireless pressure detector on the outer end of the connecting cap.

4 Claims, 5 Drawing Sheets

VALVE STEM WITH A CONNECTING CAP FOR A TIRE PRESSURE DETECTOR

BACKGROUND OF THE INVENTION

1. Field of Invention

The present invention relates to a valve stem, and more particularly to valve stem with a connecting cap for a tire pressure detector applied for a truck.

2. Description of the Related Art

With reference to FIG. 5, a conventional truck valve stem (60) has an outer section (62), an inner section (64) and a sealing nut (66). The inner section (64) is integrally and coaxially formed on the outer section (62), protrudes form an inner surface of a rim toward a tire mounted on the rim and has a distal surface and a keyed recess (642). The keyed recess (642) is formed on the distal surface of the inner section (64). The sealing nut (66) is movably mounted on the outer section (62) and is used for securely clamping the rim with the inner section for mounting the truck valve stem (60) onto the rim.

On the other hand, because people care about driving safety more and more nowadays, a tire pressure detector being integrally mounted on the inner section (64) of the truck valve stem (60) to monitor air pressures inside the tire is common and popular recently. The tire pressure detector wirelessly and continuously sends electromagnetic wave signals related to the air pressure to a tire pressure monitor system (TPMS) to allow air pressures to be constantly readable.

However, a person has to replace the whole package of the truck valve stem with the integrally mounted tire pressure detector when the tire pressure detector is damaged or out of function, but this makes waste.

The present invention provides a valve stem with a connecting cap for a tire pressure detector to obviate or mitigate the shortcomings of the conventional truck valve stem which is not capable of connecting with a wireless pressure detector.

SUMMARY OF THE INVENTION

The primary objective of the present invention is to provide a valve stem with a connecting cap for a tire pressure detector to improve adaptively for mounting a wireless pressure detector on the connecting cap and the valve stem.

The valve stem with a connecting cap for a tire pressure detector has a body, a connecting cap and a fastener. The body is tubular, is a valve stem applied for truck and has an outer section, an inner section and a fixing nut. The inner section is integrally formed coaxially on the outer section and has an outlet hole being formed thereon. The fixing nut is movably mounted on the outer section. The connecting cap is cylinder, has an outer end and a hole and is detachably mounted on the inner section. The hole is coaxially and longitudinally formed on the connecting cap. The fastener corresponds to the hole and the outlet hole and holds a wireless pressure detector on the outer end of the connecting cap.

Other objectives, advantages and novel features of the invention will become more apparent from the following detailed description when taken in conjunction with the accompanying drawings.

DETAILED DESCRIPTION OF THE INVENTION

Figure 1:
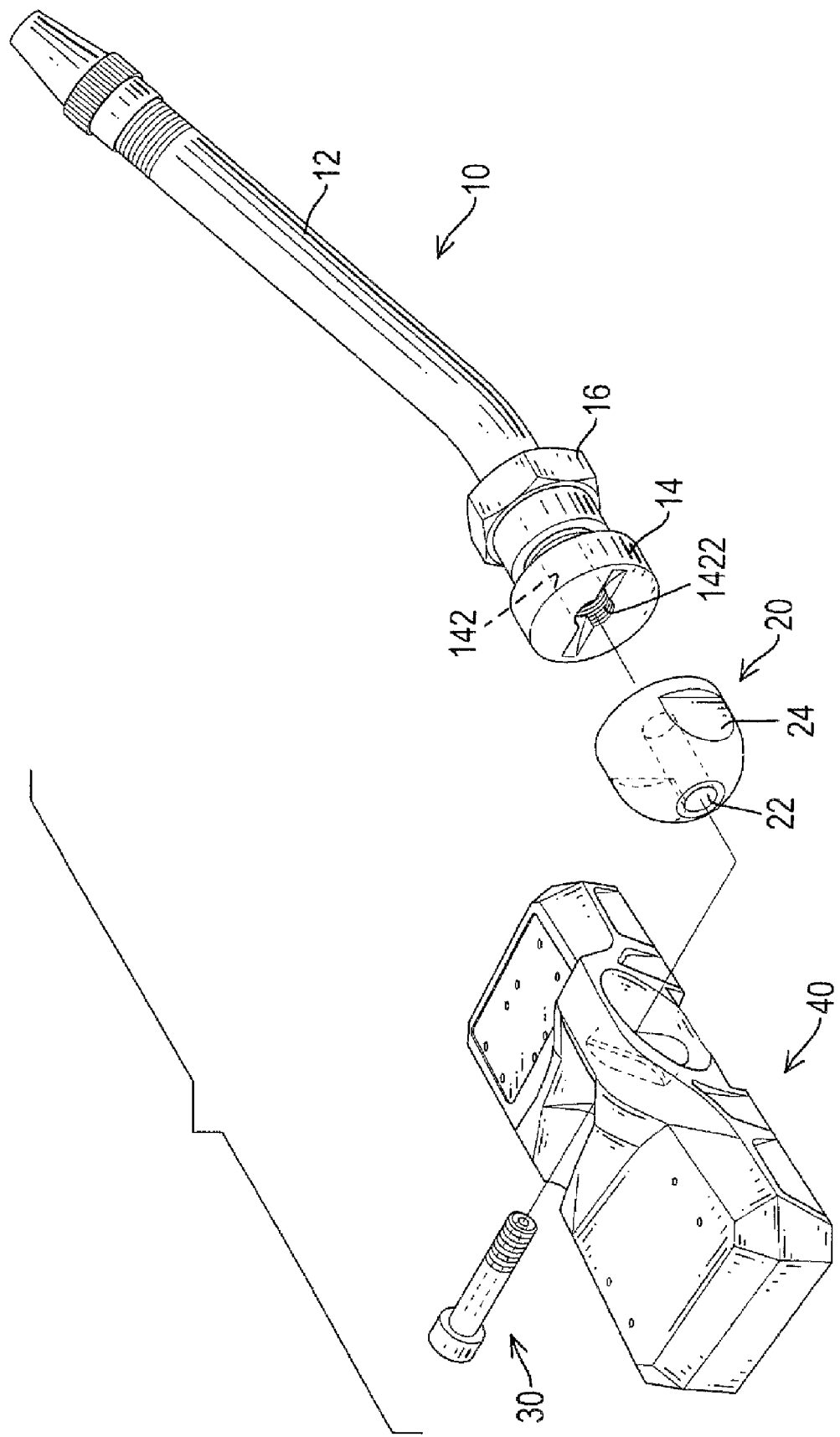
FIG. 1 is an exploded perspective view of a valve stem with a connecting cap for a tire pressure detector in accordance with the present invention.
Figure 2:
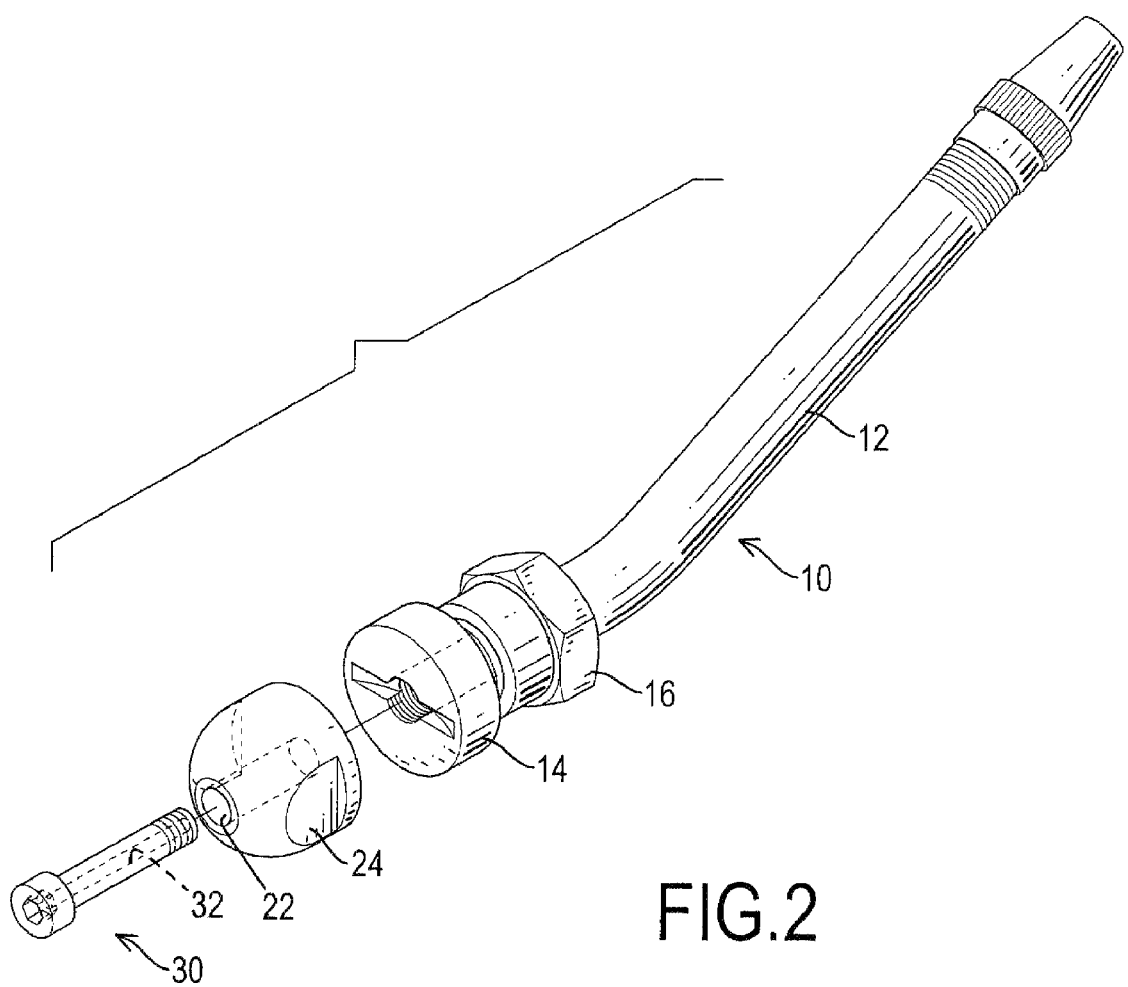
FIG. 2 is a partially exploded perspective view of the valve stem with a connecting cap for a tire pressure detector in FIG. 1.
Figure 3:
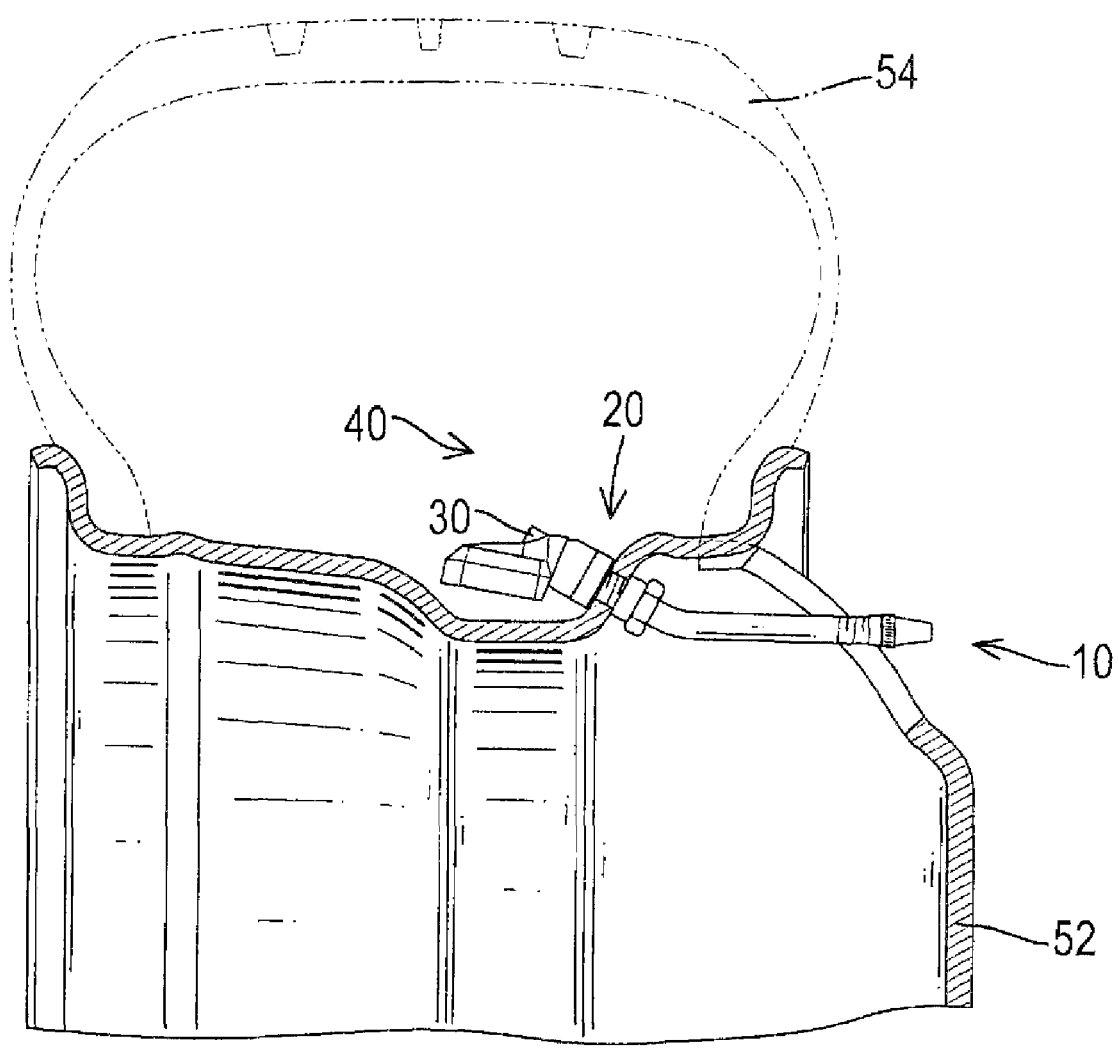
FIG. 3 is an operational perspective view in partial section of the valve stem with a connecting cap for a tire pressure detector in FIG. 1, shown the valve stem being mounted through a rim of a tire.
Figure 4:
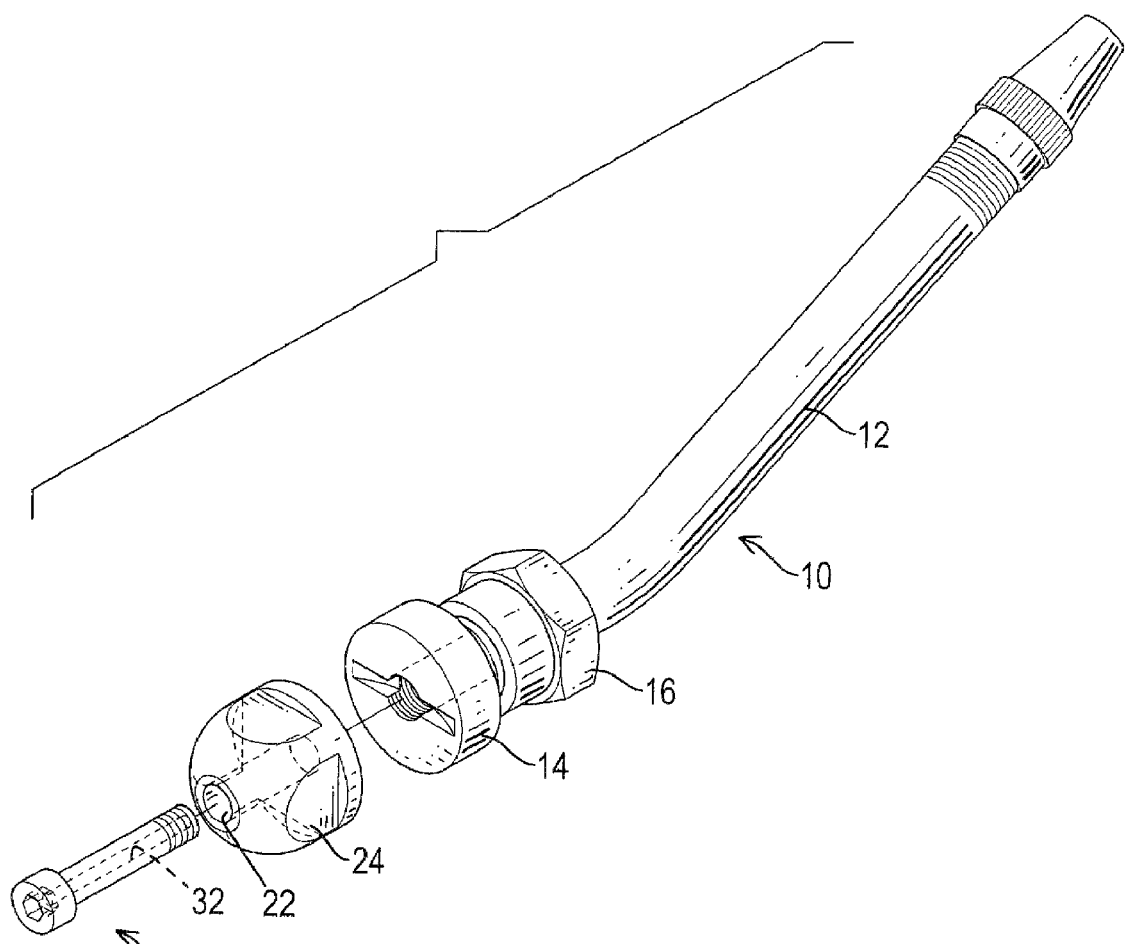
FIG. 4 is a partially exploded perspective view of the valve stem having two pairs of clamping surfaces in FIG. 1.
Figure 5:
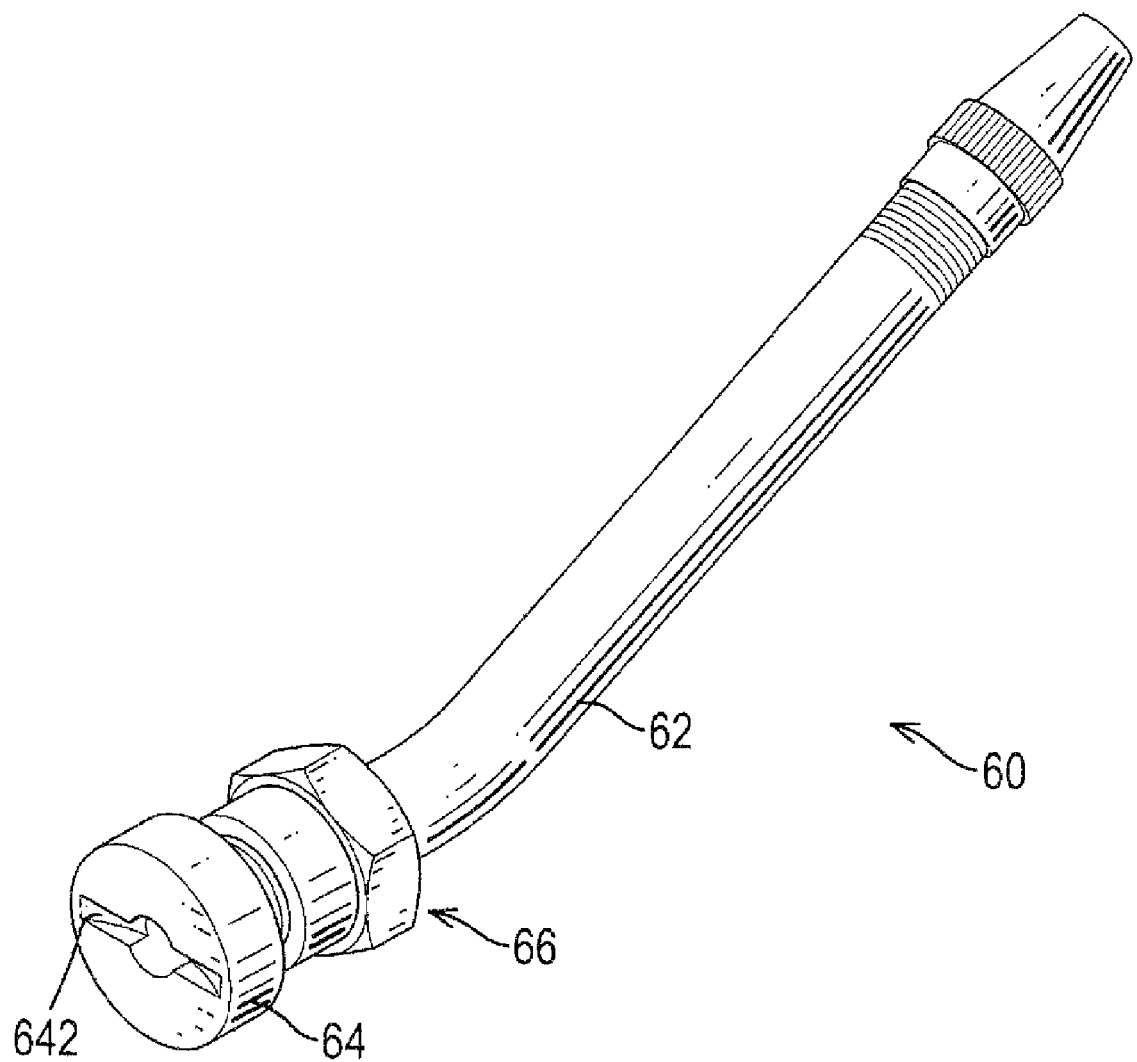
FIG. 5 is a perspective view of a conventional valve stem in accordance with the prior art.

With reference to FIGS. 1, 2, 3 and 4, a valve stem with a connecting cap for a tire pressure detector applied for a truck in accordance with the present invention comprises a body (10), a connecting cap (20) and a fastener (30).

The body (10) is tubular, is applied for a truck and has an outer section (12), an inner section (14) and a fixing nut (16).

The inner section (14) is integrally mounted coaxially on the outer section (14) and has a distal end and an outlet (142).

The outlet (142) is coaxially and longitudinally formed on the distal end through the inner section (14) and has a threaded inner surface (1422).

The fixing nut (16) is movably and rotatably mounted on the outer section (12), is selectively adjacent to the inner section (14) and is used for clamping a rim (52) of a tire (54) with the inner section (14). The rim (52) has an inner side and an outer side. The body (10) is mounted securely on the outer side of the rim (52) by the fixing nut (16) and the inner section (14).

The connecting cap (20) is cylinder, is detachably mounted on the distal end of the inner section (14) in the inner side of the rim (52) and has an inner end, an outer end, a domical surface, an annular surface, a hole (22) and may have at least one clamping surface (24).

The inner end of the connecting cap (20) corresponds to and is detachably attached to the distal end of the inner section (14).

The domical surface is formed on the outer end of the connecting cap (20).

The hole (22) is coaxially and transversely formed through the connecting cap (20) from the inner end to the outer end.

The clamping surface (24) is formed tangentially on the annular surface of the connecting cap (20). Preferably, multiple pairs of paralleling clamping surfaces (24) are formed on the annular surface of the connecting cap (20).

The fastener (30) corresponds to the hole (22) and the threaded inner surface (1422), is screwed with the threaded inner surface (1422) to securely mount a wireless pressure detector (40) on the domical surface of the connecting cap (20) through the hole (22) in the inner side of the rim (52) and has a screwed end, a rotating end, and a head. The screwed end of the fastener (30) is screwed with the threaded inner surface (1422) of the outlet (142). The head is formed on the rotating end of the fastener (30) and is extended out of the outer end of the connecting cap (20).

Hence, the wireless pressure detector (40) can be easily mounted on the body (10) after the body (10) is securely mounted on the rim (52) of the tire (54) by the screwed end of the fastener screwed with the outlet (142) of the body (10) and the head of the fastener (30) clamped the wireless pressure detector (40). Further, an attitude of the wireless pressure detector (40) relative to the connecting cap (20) and the body (10) is adjustable along the domical surface of the connecting cap (20) so that the wireless pressure detector (40) is close to the inner side of the rim (52) to reduce damaging by the tire (54) when the tire (54) is pressed.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated bar the broad general meaning of the terms in which the appended claims are expressed.

What is claimed is:

1. A valve stem with a connecting cap for a tire pressure detector mounted in a rim comprising an inner side and an outer side, wherein said valve stem comprises:
    a body being tubular and mounted securely on said outer side of said rim opposite to said tire pressure detector, said body having
        an outer section;
        an inner section integrally mounted coaxially on said outer section and comprising:
            a distal end; and
            an outlet being coaxially and longitudinally formed on said distal end through said inner section and comprising a threaded inner surface; and
        a fixing nut movably and rotatably mounted on said outer section to securely clamp said rim with said inner section and being selectively adjacent to said inner section;
    a cylindrical connecting cap detachably mounted on said distal end of said inner section in said inner side of said rim, wherein said connecting cap comprises:
        an inner end corresponding to and being detachably attached to said distal end of said inner section;
        an outer end;
        an annular surface; and
        a hole coaxially and transversely formed through said connecting cap from said inner end to said outer end of said connecting cap; and
    a fastener movably corresponding to said hole of said connecting cap, and rotatably screwed with the threaded inner surface of the outlet to hold the tire pressure detector between the fastener and the connecting cap in the inner side of the rim, and wherein said fastener comprises:
        a screwed end screwed with said threaded inner surface of said outlet;
        a rotating end; and
        a head formed on said rotating end of said fastener and extending out of said outer end of said connecting cap to clamp said tire pressure detector.

2. The valve stem with a connecting cap for a tire pressure detector of claim 1, wherein said connecting cap comprises:
    a domical surface being formed on said outer end of said connecting cap; and
    at least one clamping surface being formed tangentially on said annular surface of said connecting cap.

3. The valve stem with a connecting cap for a tire pressure detector of claim 2, wherein said connecting cap comprises a pair of paralleling clamping surfaces formed on an annular surface thereof.

4. The valve stem with a connecting cap for a tire pressure detector of claim 2, wherein said connecting cap comprises multiple pairs of paralleling clamping surfaces formed on an annular surface thereof.

* * * * *